Sept. 27, 1966  M. L. KULMAN  3,275,047
FASTENER HOLDER FOR POWER TOOLS
Filed Aug. 19, 1964  2 Sheets-Sheet 1

INVENTOR.
MELVIN L. KULMAN
BY
ATTORNEY

Sept. 27, 1966 M. L. KULMAN 3,275,047
FASTENER HOLDER FOR POWER TOOLS

Filed Aug. 19, 1964 2 Sheets-Sheet 2

INVENTOR.
MELVIN L. KULMAN
BY
*Arthur Frederick*
ATTORNEY

# United States Patent Office 3,275,047
Patented Sept. 27, 1966

3,275,047
FASTENER HOLDER FOR POWER TOOLS
Melvin L. Kulman, Sayre, Pa., assignor to Ingersoll-Rand Company, New York, N.Y., a corporation of New Jersey
Filed Aug. 19, 1964, Ser. No. 390,686
17 Claims. (Cl. 144—32)

This invention relates to fastener holders and more particularly to fastener holders for power tools such as screw drivers and nut runners.

Heretofore, fastener holding devices for power tools have included various mechanical apparatuses, such as spring-biased jaws, collets, pins, or rubber grippers, which proved unsatisfactory because of malfunction, breakage, and/or relatively short operative life. Fastener holding devices have also been constructed to include vacuum means for holding a fastener, such as disclosed in U.S. Patent No. 2,570,164. Vacuum fastener holding devices or vacuum finders such in dirt and other matter, which foreign matter accumulates and interferes with the efficient operation of the tool or renders the finder completely inoperative. In addition, vacuum finders are limited to particular-shaped fastener heads and will not function to pick up hexagonal- or square-shaped fastener heads unless the finder is specifically designed to form with the particular-shaped head a fluid seal.

Accordingly, it is an object of the present invention to provide for a power tool an improved fastener holder which is capable of picking up and holding the fasteners without regard to the shape of the fastener heads.

It is another object of this invention to provide for a power tool a fastener holder which will not collect dirt or other deleterious matter.

It is a further object of the present invention to provide for a power tool a fastener holder of simple construction and having no moving parts which are subject to wear and/or fracture.

It is, therefore, contemplated by this invention to provide a novel fastener holder for a power tool, which fastener holder comprises a finder housing or casing connected at one end to the power tool and having in the distal end thereof a recess adapted to receive the head portion of a fastener. Stop means is provided in the recess inwardly of the open end thereof against which the head of a fastener abuts. A plurality of ports communicate with the recess and with a source of pressurized fluid, such as compressed air, to provide a flow of pressurized air adjacent the head of the fastener and thereby hold the fastener in abutment against said stop means.

In one embodiment of this invention the ports are located to direct streams of pressurized fluid against the undersurface of the head of the fastener and thereby force the latter into abutment against the stop means. The pressurized fluid passes around the head of the fastener and to the atmosphere by way of a plurality of exhaust ports in the finder housing which includes a finder sleeve above the fastener head.

In a modification of the above-mentioned embodiment the exhaust ports are located in the finder housing or nosepiece above the finder sleeve which forms part of the finder housing.

In another embodiment of the present invention the ports are disposed to direct streams of pressurized fluid above the head of the fastener and to the atmosphere through the exhaust ports in the finder housing, including the finder sleeve, and thereby create a negative pressure above the upper surface of the fastener head so that the fastener is held against the stop means by reason of the differential pressure exerted on the fastener head.

The invention will be more fully understood from the following detailed description thereof when considered in connection with the accompanying drawings wherein three embodiments of the invention are illustrated by way of example and in which.

Figure 6:
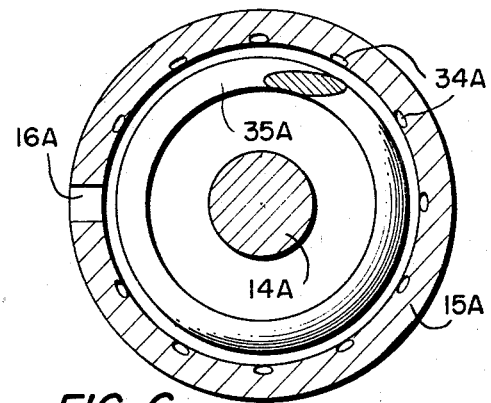
Figure 4:
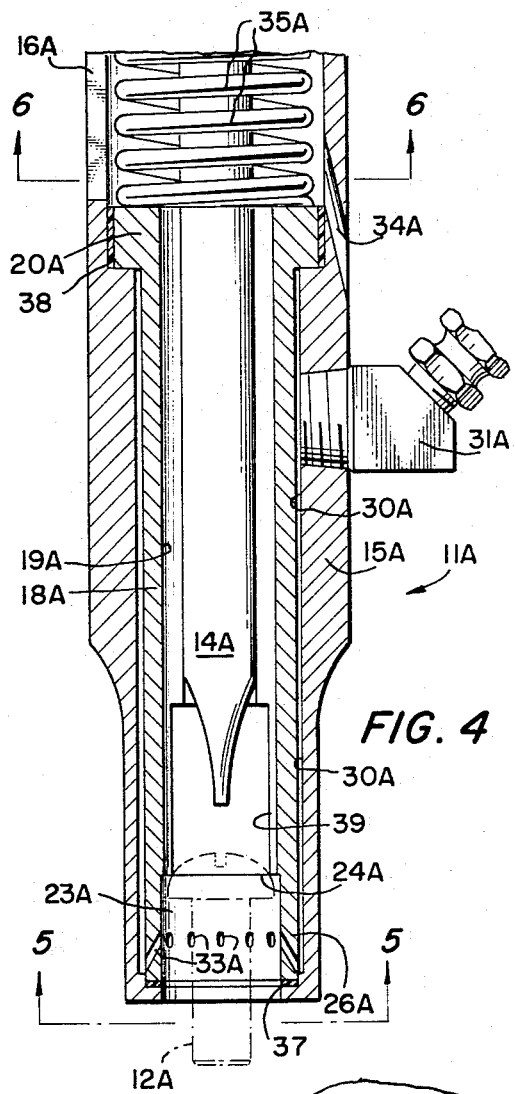
FIG. 4 is a fragmentary, cross-sectional view of a fastener holder according to another embodiment of this invention.
Figure 7:
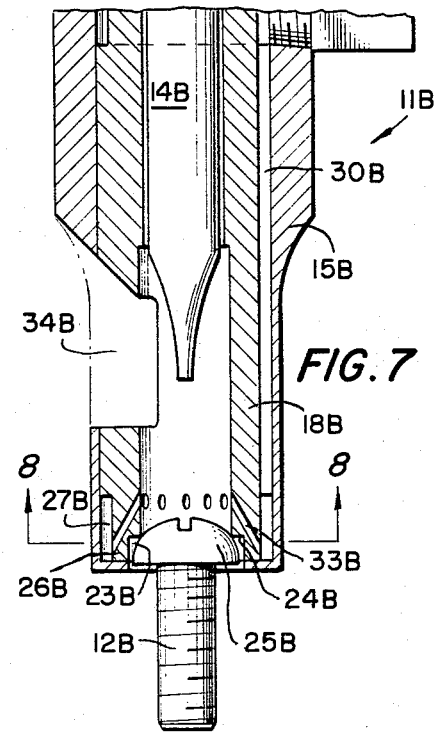
Figure 5:
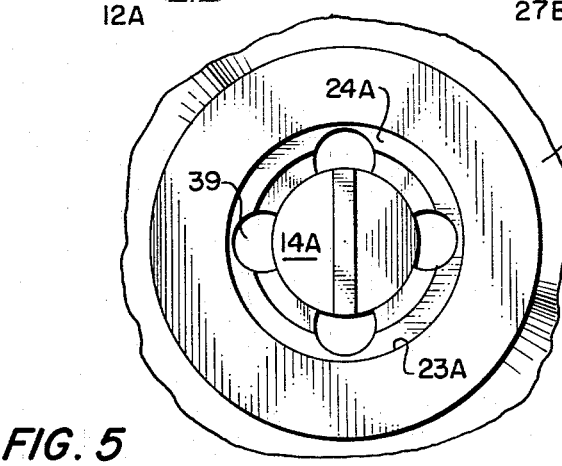
Figure 8:
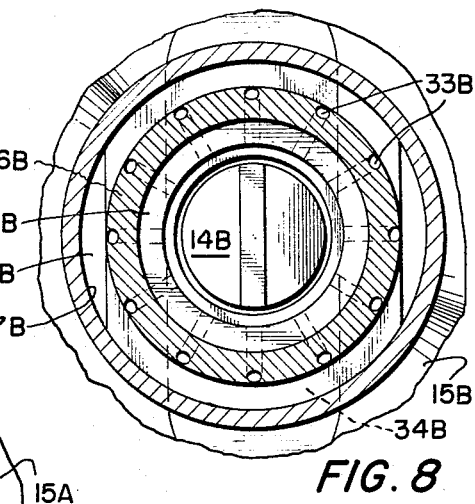

FIGS. 5 and 6 are cross-sectional views taken along lines 5—5 and 6—6, respectively, of FIG. 4 and on an enlarged scale;

FIG. 7 is a fragmentary view in cross section of a fastener holder of still another embodiment of the present invention; and FIG. 8 is a cross-sectional view, on an enlarged scale, taken along line 8—8 of FIG. 7.

Figure 1:
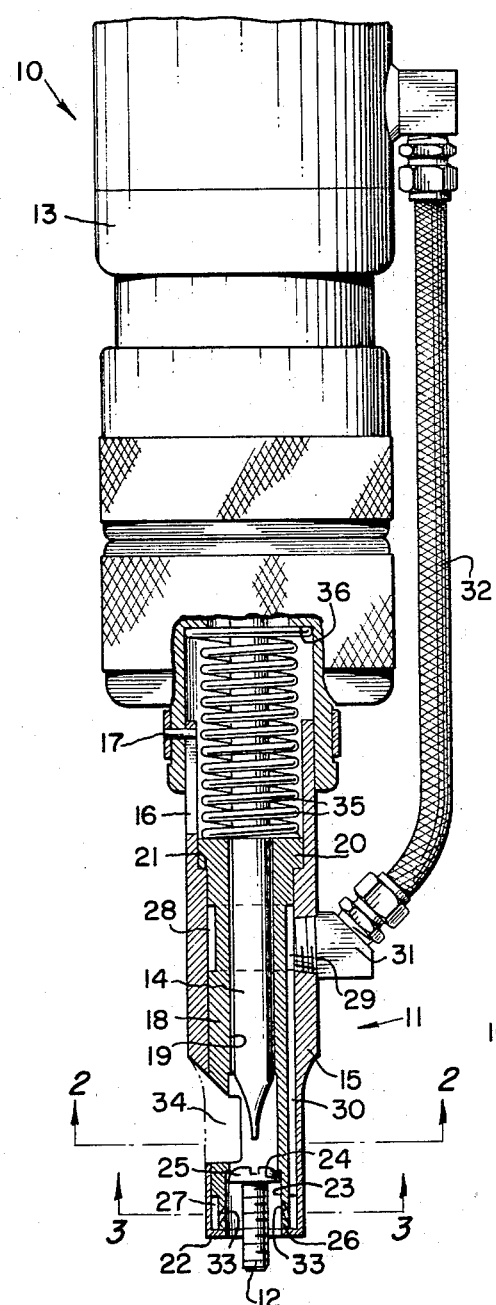
FIG. 1 is a fragmentary view, partly in elevation and partly in cross section, of a power tool having a fastener holder or finder according to one embodiment of this invention.
Figure 2:
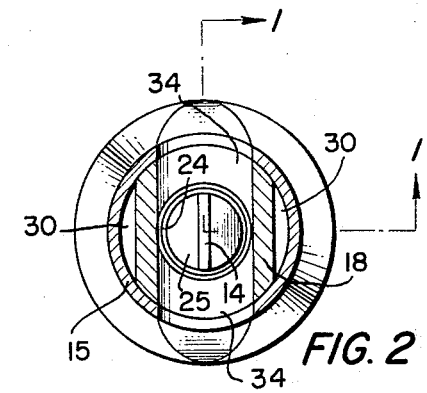
FIG. 2 is a cross-sectional view, somewhat enlarged, taken along line 2—2 of FIG. 1.
Figure 3:
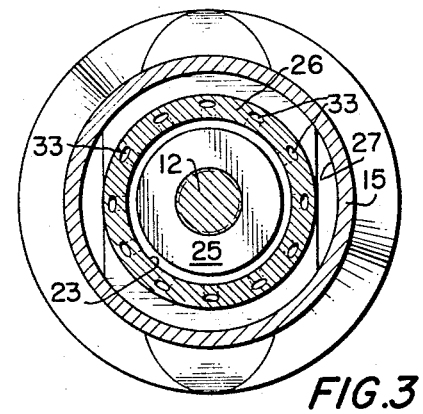
FIG. 3 is a view in cross section, somewhat enlarged, taken along line 3—3 of FIG. 1.

Now referring to the drawings and more particularly to FIGS. 1 to 3, the reference number 10 generally designates a power tool having a fastener holder or finder 11 according to one embodiment of this invention. For illustrative purposes, power tool 10 is a power screw driver adapted to turn screw-type fasteners 12.

The power tool is of any well-known conventional construction having a rotary motor (not shown), such as a pneumatically operated vane-type motor, mounted within a housing or casing 13 and connected to rotate a drive shaft or rotor (not shown). The drive shaft or rotor is connected in any suitable manner to rotate a screw blade 14 which extends into fastener holder or finder 11.

The fastener holder or finder 11 comprises a finder housing which includes a nosepiece 15 and a finder sleeve 18, the housing being secured at one end to casing 13 of power tool 10. To provide axial movement of nosepiece 15 relative to casing 13 and screw blade 14, nosepiece 15 is constructed with a longitudinally extending slot 16 in which a pin 17 projects, the pin being secured to casing 13. Within nosepiece 15 is disposed finder sleeve 18 having an axial bore 19 into which extends screw blade 14.

Finder sleeve 18 is provided with an enlarged diameter end portion 20 which is disposed in abutment against an internal, annular shoulder 21 formed in nosepiece 15. The finder sleeve 18 is also dimensioned so that its end opposite from its end portion 20 abuts an inwardly extending, annular, flanged end portion 22 of nosepiece 15. Bore 19 is counterbored to provide a fastener-receiving recess 23 and an annular shoulder 24 which forms a stop or arresting means against which the head 25 of screw-type fastener 12 abuts.

To provide for the admission of pressurized fluid, such as compressed air, into recess 23, finder sleeve 18 has a reduced diameter portion 26 adjacent recess 23, which portion defines with the inner surface of nosepiece 15 and flanged end portion 22 an annular manifold or air chamber 27. Intermediate end portion 20 and reduced diameter portion 26, finder sleeve 18 is provided with an annular groove 28 which defines with the interior surface of nosepiece 15 an air inlet chamber 29. As best shown in FIG. 2, a pair of longitudinal grooves is provided in the outer surface of finder sleeve 18 and extends between groove 28 and reduced diameter portion 26 to define a pair of air passageways 30 for conducting the compressed air from chamber 29 to chamber 27.

To supply chamber 29 with compressed air, a hose connection 31 is secured to nosepiece 15 so as to communicate with chamber 29. A flexible conduit or hose 32 is connected at one end to hose connection 31 and at the opposite end with a suitable source of compressed air. As shown in FIG. 1, flexible hose 32 is connected to casing 13 of power tool 10 to communicate with the exhaust ports (not shown) of the air motor (not shown) and thereby receive the exhaust air from the air motor.

The compressed air, which may be the air exhausted from the air motor of the power tool, is directed into recess 23 and against the undersurface of head 25 of fastener 12 by a plurality of circumferentially spaced ports 33 provided in finder sleeve 18 (see FIG. 3). The force of the streams of compressed air bearing against the underside of head 25 of fastener 12 maintains the head in abutment against shoulder 24 until displaced or forced from the latter by screw blade 14.

As best shown in FIG. 2, a pair of diametric exhaust ports 34 is provided above shoulder 24 in nosepiece 15 and finder sleeve 18. Each pair of ports 34 comprises an opening in the wall of nosepiece 15, which opening registers with an opening in the wall of finder sleeve 18 so that the registered openings provide communication between bore 19 of finder sleeve 18 and the atmosphere.

To bias fastener holder 11 in a forward direction or away from casing 13 and thus bias screw blade 14 out of engagement with fastener 12, a spring 35 is disposed around screw blade 14 with one end of the spring abutting finder sleeve 18 and the opposite end bearing against a shoulder 36 formed in casing 13.

In the operation of the above-described fastener holder 11, compressed air, such as the exhaust from an air motor (not shown), by-passed compressed air, or compressed air from some other suitable source thereof, is conducted by flexible conduit 32 to chamber 29 and thence through passageways 30 to chamber 27. From chamber 27 the compressed air discharges into recess 23 through ports 33 so that a fastener entering the recess head first is forced against and held in abutment against shoulder 24. If the head 25 forms a fluid-tight seal with shoulder 24, the air discharges from the recess to the atmosphere through the open forward end of recess 23. Any compressed air passing around head 25 and past shoulder 24 is discharged to the atmosphere through exhaust ports 34.

When a fastener 12 is held in recess 23, as explained above, the operator exerts an axial pressure on power tool 10 so that the power tool moves relative to fastener holder 11 against the force of a spring 35 until screw blade 14 engages the kerf in head 25 of screw-type fastener 12. At this time a clutch mechanism (not shown), which is conventional in such power tools, rotatively connects screw blade 14 with the air motor (not shown) so as to effect rotation of screw blade 14.

*Alternative embodiment*

In FIGS. 4, 5, and 6 an alternative fastener holder or finder 11A is shown, which fastener holder 11A differs from the embodiment illustrated in FIGS. 1 to 3 principally in that exhaust ports 34 immediately above the stop means or shoulder 24 of the embodiment shown in FIGS. 1 to 3 have been eliminated and the exhaust of compressed air is achieved through the bore 19A of finder sleeve 18A and to the atmosphere through a plurality of ports 34A in the nosepiece 15A above finder sleeve 18A. In view of the similarity of the parts of the respective fastener holders 11 and 11A, the parts of fastener holder 11A corresponding to like parts of fastener holder 11 will be identified by the same number with the suffix A added thereto.

In fastener holder 11A shown in FIGS. 4 to 6, finder sleeve 18A is of substantially uniform diameter below head end portion 20A and is dimensioned so that it defines with the inner surface of nosepiece 15A an annular passageway 30A communicating inlet connection 31A with ports 33A.

To render passageway 30A a fluid-tight chamber, a gasket 37 is disposed between diameter portion 26A and flanged end portions 22A of nosepiece 15A, and another seal 38 is disposed between the peripheral surface of head end portion 20A and the adjacent inner surface of nosepiece 15A.

A portion of the surface of bore 19A adjacent shoulder 24A is provided with cut-out portions 39 which communicate the interior of bore 19A with ports 33A when the head 25A is held firmly against shoulder 24A. This permits the exhaust of compressed air from the fastener holder during the driving of fastener 12A with a minimum of back pressure.

In the operation of the above-described fastener holder 11A, the compressed air flows from inlet connection 31A, through annular passageway 30A, to ports 33A, and into recess 23A. From recess 23A the compressed air flows upwardly through bore 19A, through the annular passageway formed between the surface of bore 19A and screw blade 14A, and thence into the chamber partly formed by nosepiece 15A above head end portion 20A of finder sleeve 18A. From the chamber partly formed by nosepiece 15A, the compressed air is exhausted to the atmosphere through exhaust ports 34A. Even when a fastener is held firmly against shoulder 24A, the compressed air is permitted to flow with minimum resistance around the head of the fastener through cut-out portions 39.

*Second alternative embodiment*

The second alternative embodiment of the present invention shown in FIGS. 7 and 8 basically differs from the embodiments shown in FIGS. 1 to 6 in that the ports for emitting the compressed air into recess 23 or 23A are disposed so as to discharge the compressed air above the head of a fastener rather than below the head of a fastener as in the embodiment shown in FIGS. 1 to 6.

The fastener holder 11B of the embodiment shown in FIGS. 7 and 8 will have the parts thereof corresponding to like parts of fastener holders 11 and 11A designated by the same reference number but with the suffix B added thereto.

As shown in FIGS. 7 and 8, fastener holder 11B is substantially of the same construction as fastener holder 11 shown in FIG. 1 except that the ports 33B are provided in the finder sleeve 18B above the shoulder 24B so as to direct streams of compressed air above and away from the upper surface of the head 25B of a screw fastener 12B. This relatively high velocity of air flow above head 25B and out through the exhaust ports 34B creates a small negative pressure or subatmospheric pressure above head 25B so that the head is held firmly against shoulder 24B by the differential pressure acting on the head.

It is believed now readily apparent that the present invention provides a novel fastener holder or finder which is of simple construction and has no moving parts. Furthermore, the invention provides a fastener holder which does not suck deleterious matter into the mechanism, which matter can cause the apparatus to malfunction. It is a fastener holder capable of holding fasteners of a relatively wide range of head sizes and shapes.

Although several embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

I claim:
1. A fastener holder for a power tool having a fastener-engaging member mounted for rotation and rotatably driven by a rotary motor, said fastener holder comprising:
   (a) a housing surrounding said fastener-engaging member and connected at one end to the power tool,
   (b) a recess in the distal end of said housing,
   (c) said recess being dimensioned to receive therein a fastener having a head,
   (d) stop means in said recess to abut the head of said fastener, and
   (e) passage means in said housing communicating with a source of compressed air and with said recess to direct the compressed air adjacent the fastener head and effect the maintenance of said fastener head against said stop means.

2. A fastener holder for a power tool having a fastener-engaging member mounted for rotation and rotatably driven by a rotary motor, said fastener holder comprising:
   (a) a housing surrounding said fastener-engaging member and connected to said power tool so as to permit relative axial movement between the fastener-engaging member and the housing,
   (b) a recess in the distal end of said housing adapted to receive therein a fastener having a head,
   (c) arresting means in said recess to abut the head of said fastener, and
   (d) passage means in said housing communication with a source of pressurized fluid and with said recess to direct the pressurized fluid adjacent said fastener head and effect the maintenance of said fastener head against said arresting means.

3. The apparatus of claim 2 wherein said housing is provided with exhaust ports remote from said arresting means for discharging the pressurized fluid.

4. A fastener holder for a power tool having a fastener-engaging member mounted for rotation and rotatably driven by a rotary pneumatic motor, said fastener holder comprising:
   (a) a tubular nosepiece connected at one end to the power tool in coaxial relationship with said fastener-engaging member and for relative axial movement with respect to said fastener-engaging member,
   (b) a sleeve disposed coaxially in said tubular nosepiece and surrounding said fastener-engaging member,
   (c) said sleeve having a recess in the end thereof adjacent the distal end of said nosepiece,
   (d) said recess being dimensioned to receive the head of a fastener therein,
   (e) stop means formed inwardly of the open end of said recess to abut the head of said fastener, and
   (f) passage means defined by said nosepiece and sleeve to communicate with a source of pressurized air and with the recess and direct the same adjacent said fastener head to effect the maintenance of the fastener head against said arresting means until it is engaged by said fastener-engaging member.

5. The apparatus of claim 4 wherein said passage means includes a plurality of ports communicating with said recess to direct the pressurized air against the undersurface of the fastener head and hold the latter against said stop means.

6. The apparatus of claim 4 wherein said passage means includes a plurality of ports communicating with said recess above the stop means to direct the pressurized air at a sufficient velocity and create a slight sub-atmospheric pressure above the fastener head so that the head is held against said stop means by the differential pressure across said fastener head.

7. A fastener holder for a power tool having a fastener-engaging member mounted for rotation and rotatably driven by a rotary motor, said fastener holder comprising:
   (a) a housing surrounding said fastener-engaging member and connected at one end to said power tool for axial movement relative to the latter,
   (b) a recess in the distal end of said housing,
   (c) said recess adapted to receive the head of a fastener therein,
   (d) stop means in said recess to abut the head of said fastener, and
   (e) passage means in said housing communicating with a source of pressurized air and with said recess to direct the pressurized air against the underside of the head of a fastener and thereby force and maintain the head against said stop means until the head is engaged by said fastener-engaging member.

8. The apparatus of claim 7 wherein said stop means is an annular shoulder means disposed in said recess inwardly of the open end of said recess.

9. The apparatus of claim 7 wherein said rotary motor is a pneumatically operated motor and said passage means is in communication with the motor to receive the exhaust air from the latter.

10. The apparatus of claim 7 wherein at least one exhaust port is provided in said housing downstream from the stop means in said recess to communicate the latter which the atmosphere.

11. A fastener holder for a power tool having a fastener-engaging member mounted for rotating and rotatably driven by rotary motor to turn a fastener having a head, said fastener holder comprising:
   (a) a tubular nosepiece coaxially disposed with respect to the fastener-engaging member and connected at one end to the power tool for axial movement relative to said fastener-engaging member,
   (b) said nosepiece being open at its distal end,
   (c) a finder sleeve disposed within said nosepiece between the inner surface of the latter and the fastener-engaging member,
   (d) said finder sleeve being connected to said nosepiece for conjoined axial movement with the latter,
   (e) a fastener head-receiving recess in the finder sleeve in register with the open distal end of the nosepiece,
   (f) stop means in said recess spaced from the open end of the recess to receive a fastener head in abutment therewith,
   (g) said finder sleeve and said nosepiece cooperating to define a fluid passageway therebetween,
   (h) conduit means for communicating said passageway with a source of pressurized air,
   (i) a plurality of circumferentially spaced ports in said finder sleeve communicating with said fluid passageway and the recess below the stop means to discharge the pressurized air into the recess and against the undersurface of the head of a fastener and thereby force and maintain the fastener head against said stop means until the head is engaged by said fastener-engaging member, and
   (j) exhaust port means disposed above said stop means to communicate the recess with the atmosphere.

12. The apparatus of claim 11 wherein said exhaust port means is disposed in the nosepiece to communicate with the interior of the nosepiece downstream from said finder sleeve and wherein an annular exhaust passageway is defined between the fastener-engaging member and the finder sleeve to communicate the recess with the exhaust port means.

13. The apparatus of claim 11 wherein the power tool has a pneumatic rotary motor and said conduit means connects with the motor to receive the exhaust air from the latter.

14. The apparatus of claim 11 wherein said stop means is a shoulder formed by a counterbore in said finder sleeve.

15. A fastener holder for a power tool having a fastener-engaging member mounted for rotation and rotatably driven by a rotary motor to turn a fastener having a head, said fastener holder comprising:

a tubular nosepiece coaxially disposed with respect to the fastener-engaging member and connected at one end to the power tool for axial movement relative to said fastener-engaging member, said nosepiece being open at its distal end, a finder sleeve disposed within said nosepiece between the inner surface of the latter and the fastener-engaging member, said finder sleeve being connected to said nosepiece for conjoined axial movement with the latter, a fastener head-receiving recess in the finder sleeve in register with the open distal end of the nosepiece, stop means in said recess spaced from the open end of the recess to receive a fastener head in abutment therewith, said finder sleeve and said nosepiece cooperating to define a fluid passageway therebetween, conduit means for communicating said passageway with a source of pressurized air, a plurality of circumferentially spaced ports in said finder sleeve communicating with said fluid passageway and recess above the stop means so as to direct the pressurized air away from the upper surfaces of the head of a fastener and thereby create a slight sub-atmospheric pressure above the head and cause the head to be held against the stop means by reason of the differential pressure across the head of the fastener, and exhaust port means disposed above said stop means to communicate the recess with the atmosphere.

16. The apparatus of claim 2 wherein said passage means includes a plurality of ports communicating with said recess to direct the pressurized air against the under-surface of the fastener head and hold the latter against said arresting means.

17. The apparatus of claim 2 wherein said passage means includes a plurality of ports communicating with said recess above the stop means to direct the pressurized air at a sufficient velocity to create a slight sub-atmospheric pressure above the fastener head so that the head is held against said arresting means by the differential pressure across said fastener head.

References Cited by the Examiner
UNITED STATES PATENTS

| | | | |
|---|---|---|---|
| 2,570,164 | 10/1951 | Shaff | 144—32 |
| 2,625,967 | 1/1953 | Stull | 144—32 |

WILLIAM W. DYER, Jr., *Primary Examiner.*

DAVID J. WILLIAMOWSKY, *Examiner.*

L. L. JOHNSON, *Assistant Examiner.*